US006982238B2

(12) United States Patent
Jens et al.

(10) Patent No.: US 6,982,238 B2
(45) Date of Patent: Jan. 3, 2006

(54) SUPPORTED CATALYST

(75) Inventors: Klaus Joachim Jens, Langesund (NO); Arild Follestad, Stathelle (NO); Siw Bodil Fredriksen, Skien (NO); Richard Blom, Oslo (NO); Ivar Martin Dahl, Oslo (NO)

(73) Assignee: Borealis Technology Oy, Porvoo (FI)

( * ) Notice: Subject to any disclaimer, the term of this patent is extended or adjusted under 35 U.S.C. 154(b) by 107 days.

(21) Appl. No.: 10/363,061

(22) PCT Filed: Aug. 30, 2001

(86) PCT No.: PCT/GB01/03877

§ 371 (c)(1),
(2), (4) Date: Apr. 18, 2003

(87) PCT Pub. No.: WO02/18046

PCT Pub. Date: Mar. 7, 2002

(65) Prior Publication Data

US 2003/0166460 A1    Sep. 4, 2003

(30) Foreign Application Priority Data

Aug. 30, 2000 (EP) .................... 0021301

(51) Int. Cl.
  *B01J 31/00*    (2006.01)
  *C08F 4/72*     (2006.01)
  *C08F 4/24*     (2006.01)

(52) U.S. Cl. .............. 502/155; 502/152; 502/159; 502/162; 502/167; 502/169; 502/171; 502/168; 526/104; 526/106; 526/170

(58) Field of Classification Search ........... 502/152, 502/155, 159, 162, 167, 168, 169, 171; 526/104, 526/106, 170
See application file for complete search history.

(56) References Cited

U.S. PATENT DOCUMENTS

| | | | | |
|---|---|---|---|---|
| 4,015,059 A | * | 3/1977 | Karol | 526/130 |
| 4,041,225 A | * | 8/1977 | Pullukat | 526/96 |
| 4,041,255 A | * | 8/1977 | Cambridge et al. | 379/372 |
| 4,054,538 A | * | 10/1977 | Johnson et al. | 502/152 |
| 4,115,425 A | * | 9/1978 | Karol et al. | 556/10 |
| 4,147,664 A | | 4/1979 | Pomogailo et al. | |
| 4,153,576 A | * | 5/1979 | Karol et al. | 502/152 |
| 4,161,462 A | | 7/1979 | Bocharov et al. | |
| 5,104,841 A | * | 4/1992 | Conroy et al. | 502/158 |
| 5,183,868 A | * | 2/1993 | Nordquest | 526/155 |
| 5,240,895 A | * | 8/1993 | Carney et al. | 502/113 |
| 5,320,996 A | * | 6/1994 | Carney et al. | 502/113 |
| 5,324,697 A | * | 6/1994 | Mueller et al. | 502/112 |
| 5,362,824 A | | 11/1994 | Furtek et al. | |
| 5,376,612 A | * | 12/1994 | Reagen et al. | 502/104 |
| 5,418,200 A | * | 5/1995 | Carney et al. | 502/117 |
| 5,543,376 A | * | 8/1996 | Bergmeister | 502/117 |
| 5,587,439 A | | 12/1996 | DiMaio | |
| 5,593,931 A | * | 1/1997 | Beach et al. | 502/117 |
| 5,624,877 A | * | 4/1997 | Bergmeister et al. | 502/120 |
| 6,096,679 A | * | 8/2000 | Lonfils et al. | 502/154 |
| 6,100,214 A | | 8/2000 | Walzer, Jr. et al. | |
| 6,197,901 B1 | * | 3/2001 | Rohde et al. | 526/132 |
| 6,214,947 B1 | * | 4/2001 | Debras et al. | 526/96 |
| 6,228,795 B1 | | 5/2001 | Vizzini | |
| 6,255,418 B1 | * | 7/2001 | Jolly et al. | 526/160 |
| 6,388,029 B1 | * | 5/2002 | Llinas et al. | 526/128 |

FOREIGN PATENT DOCUMENTS

| | | |
|---|---|---|
| EP | 0 633 272 A | 1/1995 |
| EP | 0 757 992 A | 2/1997 |
| EP | 0 767 184 A | 4/1997 |
| WO | 98 55518 A | 12/1998 |
| WO | WO 00/04058 | 1/2000 |
| WO | 01 42249 A | 6/2001 |

* cited by examiner

*Primary Examiner*—J. A. Lorengo
*Assistant Examiner*—J. Pasterczyk
(74) *Attorney, Agent, or Firm*—Nixon & Vanderhye P.C.

(57) ABSTRACT

The invention provides a supported chromium catalyst system comprising a chromium catalyst precursor bound via at least one heteroatom to a functionalised support, said heteroatom being connected to said support via an organic group.

15 Claims, 1 Drawing Sheet

SUPPORTED CATALYST

This invention relates to a new supported catalyst system capable of producing polyolefins having a broad or narrow molecular weight distribution, and in particular to a chromium catalyst precursor supported on a functionalised carrier.

The use of chromium catalysis for the polymerisation of olefins is well established in the art. Whilst these catalysts may be used alone, conventionally chromium catalysts, e.g. chromium oxides are supported on a carrier, e.g. an oxide support such as silica or alumina. Such supported catalyst systems are used either without a cocatalyst or with a metal alkyl cocatalyst as is well known in the art.

In the polymerisation of ethylene, all known supported chromium catalysts of the type hereinbefore described give rise to polyethylene with a broad molecular weight distribution. Such polyethylenes may comprise low molecular weight fractions that may give rise to unwanted smell and/or very high molecular weight components that may cause the formation of inhomogeneous gels in the polymer product.

It would therefore be desirable if a product having a narrow molecular weight distribution could be prepared using chromium catalysis to alleviate the problems discussed above. Also, it would be desirable if a catalyst system could be found which allowed the production of polymers with varying Mw/Mn values simply by varying the nature of the support.

It has now been surprisingly found that by supporting chromium catalyst precursors on certain functionalised polymer supports, a broad or narrow molecular weight polyolefin product may ultimately be produced depending on the nature of the functionalised support. The polymer support may for example be a functionalised polystyrene as described in U.S. Pat. No. 4,623,707. This Patent teaches the use of a functionalised polystyrene carrier in supporting a Ziegler-Natta catalyst and is herein incorporated by reference. However, whilst the functionalised supports have previously been described, never before have they been proposed for use with chromium catalyst precursors allowing the formation of polyolefins having tailorable molecular weight distributions.

Thus, viewed from one aspect the invention provides a supported chromium catalyst system comprising a chromium catalyst bound via at least one heteroatom, e.g. a nitrogen, sulphur, phosphorus or oxygen atom, to a functionalised support, said heteroatom being connected to said support via an organic group.

Viewed from another aspect the invention provides a process for the preparation of a supported chromium catalyst system comprising:

(I) reacting a chromium catalyst precursor with a functionalised support in a solvent to bind said chromium catalyst precursor to said functionalised support via at least one heteroatom, e.g. a nitrogen, sulphur or oxygen atom, attached to said support via an organic group; and (II) recovering a supported catalyst as a free-flowing solid or slurry.

Viewed from yet another aspect the invention provides the use of a supported catalyst system as hereinbefore described in the polymerisation of olefins.

Viewed from still yet another aspect the invention provides a method of polymerisation comprising polymerising at least one olefin in the presence of a supported catalyst system as hereinbefore described.

Viewed from a yet further aspect the invention provides polyolefins prepared using the supported chromium catalyst system as hereinbefore described.

The supported catalyst of the invention comprises a chromium catalyst bound to the functionalised support via a heteroatom. This is achieved by reacting a chromium catalyst precursor with the functionalised support. The chromium catalyst precursor may be selected from a wide variety of suitable precursors but must be a precursor capable of forming at least one bond, e.g. 1 to 3 bonds with the heteroatoms connected to the surface of the functionalised support. Suitable precursors will be readily determined by the person skilled in the art.

In one embodiment, the chromium catalyst precursor should carry at least one, e.g. two groups which are capable of being displaced by the heteroatoms present on the support. Suitable leaving groups will be readily determined by the artisan. For example, suitable chromium catalyst precursors include those of formula (I)

$$CrA_xB_y \qquad (I)$$

wherein each A independently represents any group or groups which remain bound to the chromium after contact with the support e.g. an η-ligand, for example an open chain $\eta^3$, $\eta^4$ or $\eta^5$ ligand or a closed ring $\eta^5$ ligand such as cyclopentadienyl, indenyl, or fluorenyl ligand, or an oxo group;

each B independently represents a leaving group such as halogen (e.g. chlorine, bromine or iodine, especially chlorine), alkenyl (e.g. allyl or 2-methyl allyl), siloxy, alkyl, alkoxy, amido and cyclopentadienyl;

x is an integer of 1 or 2; and y is an integer of 1 or 2 wherein x+y is 3.

By leaving group is meant a group which is capable of being displaced by a heteroatom attached via an organic group to the support.

Alternatively, the chromium catalyst precursor may be of formula (II)

$$CrD_4 \qquad (II)$$

wherein each D independently represents alkyl, siloxy, alkoxide, oxo, halo, aryl, e.g. phenyl.

Alternatively, the chromium catalyst precursor may have at least one, e.g. two free coordination sites to allow the formation of one or more bonds between the chromium catalyst precursor and the heteroatoms present on the support without any displacement taking place. Suitable such species include a Cr(η-ligand)$_2$ or CrD(η-ligand) precursor where D is as hereinbefore defined and the η-bonding ligands which may be the same or different may, for example, be of formula III $$CpY_m \qquad (III)$$

where Cp is an unsubstituted, mono-substituted or polysubstituted homo or heterocyclic cyclopentadienyl, indenyl, tetrahydroindenyl, fluorenyl, benzindenyl, cyclopenta[l] phenanthrenyl, azulenyl, or octahydrofluorenyl ligand or a heterocyclic analog thereof, e.g. containing a ring nitrogen, boron, sulphur or phosphorus; m is zero or an integer having a value of 1, 2, 3, 4 or 5; and where present each Y which may be the same or different is a substituent attached to a ring atom of Cp and selected from halogen atoms, and alkyl, alkenyl, aryl, aralkyl, alkoxy, alkylthio, alkylamino, (alkyl)$_2$ P, siloxy (e.g. alkylsiloxy), germyloxy (e.g. alkylgermyloxy), acyl and acyloxy groups or one Y comprises an atom or group providing an atom chain comprising 1 to 4 atoms selected from C, O, S, N, Si, Ge and P, especially C and Si (e.g. an ethylene group) to a second η-ligand of formula II, e.g. an unsubstituted, mono-substituted or polysubstituted homo or heterocyclic cyclopentadienyl, indenyl, tetrahydroindenyl, fluorenyl or octahydrofluorenyl ligand group.

In the compounds described herein unless otherwise specified any hydrocarbyl moiety preferably contains up to 20 carbon atoms, more preferably up to 10 carbons, especially up to 6 carbons.

In the η-bonding ligands of formula II, the rings fused to the homo or hetero cyclopentadienyl rings may themselves be optionally substituted e.g. by halogen atoms or hydrocarbyl groups containing 1 to 20 carbon atoms.

Many examples of such η-bonding ligands and their synthesis are known from the literature, see for example: Möhring et al. J. Organomet. Chem 479:1–29 (1994), Brintzinger et al. Angew. Chem. Int. Ed. Engl. 34:1143–1170 (1995).

Examples of suitable η-bonding ligands include the following:

cyclopentadienyl, indenyl, fluorenyl, pentamethyl-cyclopentadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indeny, 1,3,4-tri-naphthyl-cyclopentadienyl, 1,4-di-methyl-indenyl, 1,4-di-i-propyl-indenyl 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

Where the chromium catalyst precursor binds to more than one heteroatom present on the support, it is, of course, possible for one chromium: support heteroatom bond to be formed in a vacant chromium coordination site whilst the other chromium: support heteroatom bond is formed via displacement of a leaving group present in the catalyst precursor.

The bonds between the heteroatoms present on the catalyst support and the chromium catalyst preferably form directly from the chromium atom, i.e. a chromium atom to heteroatom bond. The chromium atom may be in any convenient oxidation state, e.g. 1 to 4 or 6, especially 3, 4 or 6.

Particularly preferred chromium catalyst precursors include $Cr(allyl)_3$, tris(2-methyl allyl) chromium, $CrCp'_2$, $O_2CrCl_2$, $O_2Cr(OSiR'_3)_2$ wherein Cp' represents an unsubstituted cyclopentadienyl group and R' represents an optionally substituted alkyl, aryl or alkenyl group, e.g. phenyl, tertbutyl, methyl, isopropyl, octenyl, ethyl, 1,1,2,2-tetramethylpropyl.

The terms "support" or "carrier" are used interchangeably herein to mean any material capable of supporting catalytically active compounds. The support material for use in the invention preferably comprises an organic polymer, preferably an organic porous polymer provided in the form of distinct particles. Preferably, the support material will comprise porous polymer particles optionally cross-linked by physical or chemical means, for example using conventional cross-linking agents, e.g. divinylbenzene. Preferred support materials include acrylate polymer particles or styrene-divinylbenzene polymer particles.

As used herein, the term "functionalised support" is used to define any support which has been functionalised so as to carry heteroatoms on its surface capable of forming a chemical bond with the chromium catalyst precursor. Examples of suitable functionalised supports are therefore those which carry at least one XH groups in which each X is independently an organic group and H is an active hydrogen atom attached to a heteroatom in the organic group X, the heteroatom having at least one electron pair available for coordination to the chromium catalyst precursor. Suitable heteroatoms which may be present in the organic group X are those of groups 15 and 16 of the Periodic Table, preferably, O, P, S and N, particularly O.

Preferred functionalised supports for use in the invention are those having a $pK_a<30$, preferably <25, more preferably <20. Particularly preferred for use in the invention are organic polymer supports carrying —OH, —N(alkyl)H or —$NH_2$ groups. It is preferred if the OH groups are not directly attached to an aryl ring.

The use of functionalized organic polymer particles having labile hydrogens with pKa <20 (especially benzylic hydrogens, i.e. attached to a heteroatom attached to a carbon attached to a phenyl ring) as supports for Cr and optionally a metallocene, is novel and forms a further aspect of the present invention. Viewed from this aspect the invention provides a heterogeneous olefin polymerization catalyst comprising a particulate organic polymer support having a pKa of less than 20, metallated with a catalytically effective amount of chromium.

Especially preferred for use in the invention are polymer supports comprising divinylbenzene cross-linked polystyrene particles modified to carry functional hydroxy groups. Functional groups available as attachment sites may be introduced by conventional techniques, for example using a functionalised monomer when preparing the co-polymer. Alternatively, functional groups may be introduced by appropriate modification (e.g. chemical modification) of a non-functionalised co-polymer. Functionalised supports for use in the invention may, for example, be prepared in a manner analogous to that described by Ellingsen et al., J. Chrom. 535:147, 1990.

The use of a polymeric support, as opposed to a conventional silica support, is also believed to give rise to polymers suitable for use in electrical insulation applications. The use of silica particles in a polymerisation catalyst may give rise to "cracks" in the eventual polymer through which moisture or water may be able to seep. Such polymers are therefore not suitable to protect electrical cables and cannot act as insulators. The functionalised supports of the present invention are believed to give rise to polymers free from such cracks and therefore have wide spread applications in the field of electrical insulation.

When the chromium catalyst is bound to the support via two or more heteroatoms, the heteroatoms which bind to the chromium catalyst precursor may be attached to the functionalised support by separate organic groups, or may be bound to two heteroatoms which form part of the same organic group, e.g. the hydroxyl groups present in a diol.

It has surprisingly been found that where the chromium catalyst binds to a diol present on the support surface, the resulting polymer possesses a broad molecular weight distribution. Where the chromium catalyst binds to two heteroatoms present on separate organic groups, the resulting polymer is found to have a very narrow molecular weight distribution. Without wishing to be limited by theory, it is believed that by binding to heteroatoms present on separate organic groups present on the support surface the system has a greater flexibility compared to the case where the chromium catalyst is bound to the much more rigid diol system. It is believed that the greater flexibility gives rise to a catalyst which allows production of a narrow molecular weight species.

In an especially preferred embodiment, the catalyst system of the invention is employed in the manufacture of polymers having a narrow molecular weight distribution which has not been possible using previous chromium catalysts systems such as $CrO/SiO_2$, $CrCp2/SiO_2$, silylchromate/$SiO_2$—$Al_2O_3$, $Cr(allyl)_3/SiO_2$, or $Cr\ (cumene)_2/SiO_2$—$Al_2O_3$.

Suitable organic groups XH include $C_{1-10}$ alcohols, especially $C_{1-6}$ alcohols, $C_{1-10}$ amines, especially $C_{1-6}$ amines, $C_{1-10}$ thiols, especially $C_{1-6}$ thiols, optionally substituted aryl groups carrying NH, OH or SH moieties, e.g. benzyl alcohol, phenol, aniline all preferably bound to the support by the 4-position of the benzene ring. Further suitable groups will be readily determined by the skilled artisan.

It is of course possible for the XH group to have two or more heteroatoms and the chromium catalyst precursor may bind to one or both heteroatoms on the same organic group. Suitable XH groups in this regard include diamines and diols such as (1,2-dihydroxyethyl) phenyl.

Where the XH group carries a single heteroatom and the chromium catalyst precursor has two sites available for binding heteroatoms it is obviously more likely that the chromium catalyst precursor will bond to two heteroatoms on adjacent XH groups if there is a high surface density of XH groups on the support. If there is a low surface density of XH groups present on the support then it is envisaged that the chromium catalyst precursor will bind to a single XH group irrespective of whether it carries further possible coordination sites. Such an arrangement is believed to give rise to low molecular weight oligomeric polymer products.

The terms "co-catalyst" and "activator" are used interchangeably herein to define any compound or component which is capable of activating a chromium catalyst following attachment to the support. The activator compound should preferably be one capable of stabilising a chromium catalyst without affecting its ability to function as a catalyst and must be sufficiently labile to permit displacement by an olefin monomer or other polymerisable species during polymerisation. Preferably the supported activator will be non-coordinating or weakly coordinating towards the chromium.

Advantageously, the catalyst system herein described may be used in the absence of co-catalyst. However, for certain systems, e.g. those in which oxo or halogen groups are present in the chromium catalyst a cocatalyst may be used. Suitable cocatalysts are well known and include alkyl aluminium compounds, in particular alumoxanes, and metal alkyls, e.g. Zn, Mg, Al or B alkyls. Suitable alumoxanes include $C_{1-10}$ alkyl alumoxanes, e.g. methyl alumoxane (MAO) and isobutyl alumoxanes (e.g. tetra and hexaisobutyl alumoxanes, TIBAO and HIBAO), especially MAO. Alumoxane co-catalysts are described by Hoechst in WO-A-94/28034. These are linear or cyclic oligomers having up to 40, preferably 3 to 20, —[Al(R")O]—repeat units (where R" is hydrogen, $C_{1-10}$ alkyl, preferably methyl, or $C_{6-18}$ aryl or mixtures thereof).

The supported catalyst of the invention may be prepared by combining the functionalised support and the chromium catalyst precursor in a solvent.

Suitable solvents for use in the methods of the invention include aliphatic and alicyclic hydrocarbons such as isobutane, butane, pentane, hexane, heptane, cyclohexane, cycloheptane etc. and aromatic compounds such as benzene, toluene, xylene etc. Reactions are conveniently carried out in an inert, moisture-free, oxygen-free environment due to the sensitivity of the catalyst components to moisture and oxygen. Preferably the addition of the chromium catalyst precursor to the support takes place at low temperature e.g. between −80 to 20° C., preferably between −30 and 0° C., preferably −10° C. The supported catalyst system may readily be isolated by removing the solvent in vacuo, by filtration or may be used directly in a slurry state for direct use.

Where a cocatalyst is being employed this may conveniently be added to the supported chromium catalyst system by standard procedures. For example, MAO may be added to the carrier in toluene.

The supported chromium catalysts herein described may be used to polymerise any olefin or mixture of olefins, for example optionally substituted $C_{2-30}$ α-olefins. $C_{2-8}$ α-olefins and mixtures thereof, e.g. $C_2$- or $C_3$-olefins, are particularly preferred. The process of the invention is particularly suitable for the polymerisation of α-olefins such as ethylene, propylene, 1-butene, 1-pentene, 1-hexene, 3-methyl-1-butene and 4-methyl-1-pentene, especially preferably ethylene.

The catalyst systems may be used in any polymerisation or pre-polymerisation process, e.g. gas, slurry or solution phase. Preferably, these will be used in gas or slurry phase reactors. Polymerisation according to the invention may be performed using standard polymerisation techniques and using conventional polymerisation reactors, e.g. loop reactors, gas phase reactors, or stirred tank reactors.

The polymerisation process of the invention is typically conducted in the presence of a diluent. As a diluent, a linear, branched or cyclic saturated hydrocarbon such as isobutane may be used.

In a further embodiment the support may be impregnated with a polymerisation active metal complex/activator solution to give a dual site catalyst which has one site which is sensitive to hydrogen concentration and one site which is less sensitive to hydrogen concentration. Such a catalyst species may allow the formation of bimodal polymers in which depending on the nature of the functionalised support very specific molecular weight distributions may be achieved.

The polymerisation active metal complex may be a complex carrying ligands such as alkoxy groups, acetylacetonates, bis(alkylamidinate), etc. Such ligands are described by G. J. P. Britovsek et al, Angew. Chem. Int. Ed. 1999, 38, 428–447. Preferably however, the polymerisation active metal complex is a metallocene catalyst. Metallocene catalysts for use in this regard may be any conventional metallocene catalyst. As used herein, the term metallocene is used to refer to all catalytically active metal: η-ligand complexes in which a metal is complexed by one, two or more open chain or closed ring η-ligands. The use of bridged bis-η-ligand metallocenes, single η-ligand "half metallocenes", and bridged η-σ ligand "scorpionate" metallocenes is particularly preferred. The metal in such complexes is preferably a group 4 to 10 metal or a lanthanide or actinide, especially a group 4, 5 or 6 metal, particularly Zr, Hf or Ti. The η-ligand preferably comprises an $\eta^4$ or $\eta^5$ open chain or an $\eta^5$-cyclopentadienyl ring, optionally with a ring or chain carbon replaced by a heteroatom (e.g. N, B, S or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Suitable η-ligands, include those of formula II discussed above. Examples of such homo or heterocyclic cyclopentadienyl ligands are well known in the art (see e.g. EP-A-416815, WO96/04290, EP-A-485821, EP-A-485823, U.S. Pat. No. 5,276,208 and U.S. Pat No. 5,145,819).

Besides the η-ligand, the metallocene complex used according to the invention may include other ligands; typically these may be halide, hydride, alkyl, aryl, alkoxy, aryloxy, amide, carbamide or other two electron donor groups. Any hydrocarbyl ligand here will generally contain up to 20 carbons, preferably up to 10 carbons, e.g. up to 6 carbons.

The polymerisation active metal complex, e.g. metallocene is conveniently impregnated into the support after the chromium catalyst precursor has been bound to the support surface. Preferably, the polymerisation active metal complex is added to the dried support complex in toluene optionally in the presence of a cocatalyst, e.g. MAO. After impregnation the final supported catalyst system may be conveniently dried in vacuo or may be used kept in a slurry state for direct use.

The supported catalysts are most usefully employed in either gas or slurry phase processes, both of which are well known in the art. The temperature of the polymerisation reaction will typically be in the range of from 0 to 300° C., preferably from 60 to 120° C. The pressure employed for the olefin or olefins is typically from 1 to 2000 bars, preferably from 5 to 20 bars. The residence time is generally from 1 minute to 20 hours, preferably from 0.5 to 6 hours.

For slurry reactors, the reaction temperature will generally be in the range 60 to 100° C. (e.g. 85–110° C.), the reactor pressure will generally be in the range 5 to 80 bar (e.g. 25–65 bar), and the residence time will generally be in the range 0.3 to 5 hours (e.g. 0.5 to 2 hours). The diluent used will generally be an aliphatic hydrocarbon having a boiling point in the range −70 to +100° C., especially isobutane.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer (e.g. ethylene or propylene and/or other comonomers).

It is within the scope of the application to employ the supported catalyst as hereinbefore described together with another catalyst, e.g. a metallocene catalyst, Ziegler catalyst, etc. It is preferred however to employ the supported chromium catalyst system of the invention in the absence of other catalyst materials.

As previously mentioned, polyolefins produced by the supported catalyst system of the invention have tailorable molecular weight distributions, e.g. $M_w/M_n=1$ to 100, preferably 3 to 80. Also, the product polyolefins have an $MFR_{21}/MFR_2<200$ and an $MFR_2<50$.

Moreover it has surprisingly been found that the electrical properties of the polyolefins prepared using the supported catalyst system of the invention are advantageous.

Pre-polymerisation of the supported catalyst of the invention may be used for further control of the polymer particle morphology, e.g. in typical gas phase or slurry reaction processes.

The polymers produced in accordance with the invention may be formulated together with conventional additives, e.g. antioxidants, UV-stabilizers, colors, fillers, plasticizers, etc. and can be used for fibre or film extrusion or for raffia, or for pipes, or for cable or wire applications or for moulding, e.g. injection moulding, blow moulding, rotational moulding, etc., using conventional moulding and extrusion equipment.

The invention will now be described further by way of the following non-limiting Examples and figures.

EXAMPLE 1

Preparation of trisallyl-chromium and tris(2-methyl-allyl) chromium

Figure 1:
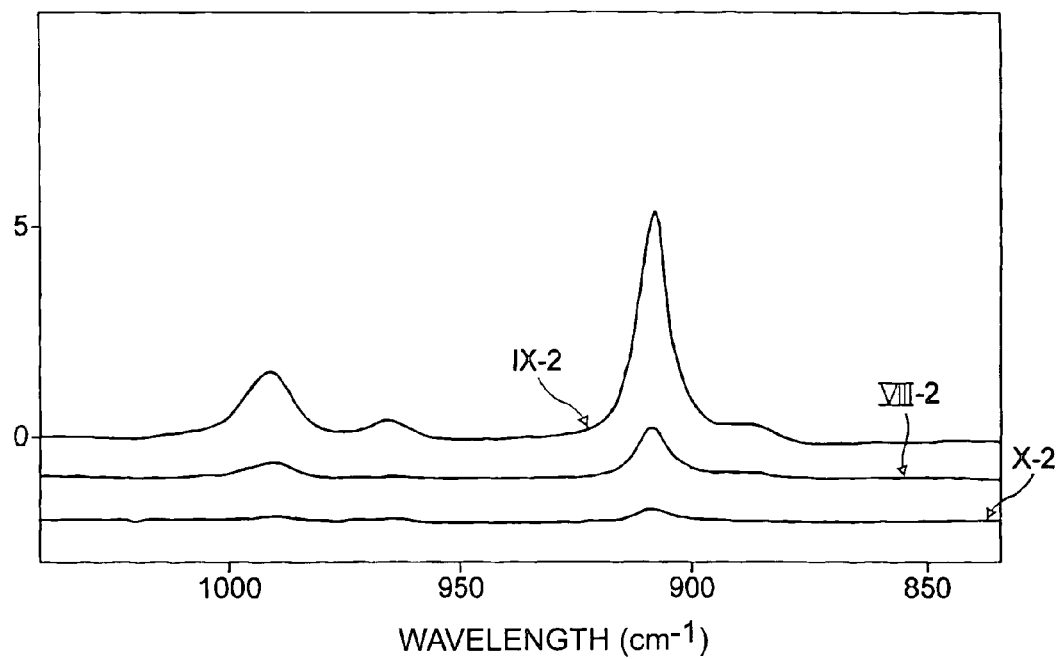
FIG. 1 depicts the IR spectra of the polymer produced with the $(nBuCp)_2ZrCl_2$/MAO/Support A (Example 9—Catalyst X) and the two combined Catalysts VIII and IX (Examples 7 and 8), all produced at 38 bar total pressure and 1.0 bar $H_2$ from the start.
Figure 2:
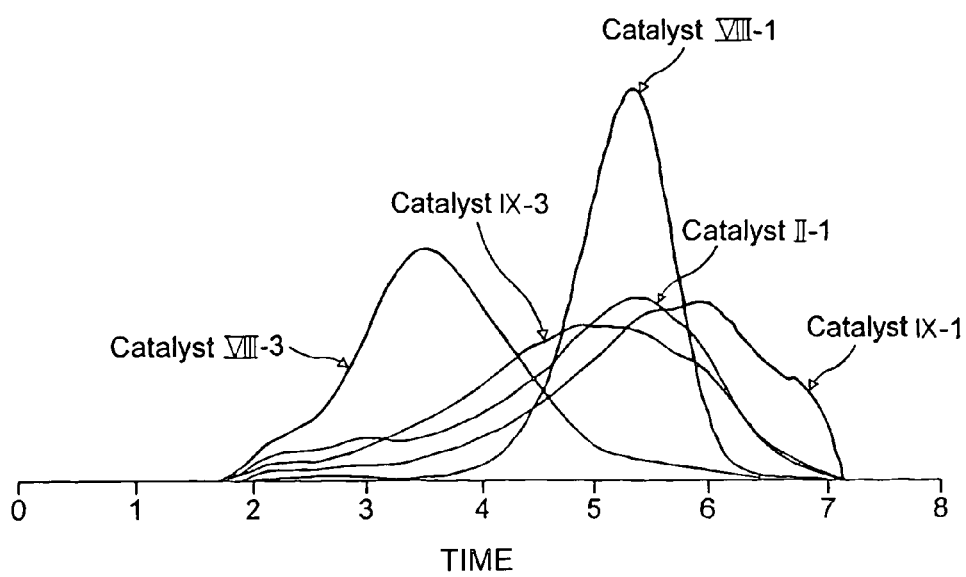
FIG. 2 depicts the GPC traces of polymers produced with Cr(2-Me-allyl)$_3$/E-110 (Catalyst IX) and with $(nBuCp)_2ZrCl_2$/MAO/Cr(2-Me-allyl)$_3$/E-110 (Catalyst VIII) with high and low Cr/Zr loading.

A Schlenck flask containing $CrCl_3$ was heated under vacuum by the use of a gas flame before starting the reaction. To a slurry of $CrCl_3$ (0.90 g, 5.68 mmol) in 20 ml ether at −30° C. was added allylmagnesium bromide (or 2-methylallylmagnesium bromide) (50 ml, 18.5 mmol, as a 0.369 M ether solution) dropwise over a period of 2 hrs. Stirring was continued for another 3 hrs at −30° C. and overnight at −70° C. The inorganic magnesium salts were removed by filtration (washed with 25 ml ether) at −30° C., and all volatiles were removed under reduced pressure. The product was extracted in pentane (50+25 ml) at −20° C. and filtrated. Yield: 72.6% based on Cr-analysis (ICP-AES).

EXAMPLE 2

Preparation of Supported tris(2-methylallyl)chromium

Two supports were used to support tris(2-methylallyl)-chromium. Support A is a p-hydroxymethylstyrene-co-divinylbenzene polymer prepared by copolymerising p-hydroxymethylstyrene and divinylbenzene as described by Ellingsen et al., J. Crom. 535 (1990) 147. The particles formed, has a degree of crosslinking of 60%, a porosity of 75% and an average particle diameter of 30 microns. The amount of available hydroxy groups was measured by reacting 100 mg of the support with tert-butyl-lithium at −30° C. in a known volume of pentane, distilling the volatiles into a separate Schlenck bottle and measuring the amount of isobutane formed by GC analysis. 1.2 mmol OH/g support was measured for Support A.

Support B is a p-(1,2-dihydroxyethyl)styrene-co-styrene-co-divinylbenzene polymer prepared by copolymerising p-(1,2-dihydroxyethyl)styrene, styrene and divinylbenzene in a similar manner as for Support A. The particles formed, has a degree of crossbinding of 71%, a porosity of 70% and an average particle diameter of 30 microns. The amount of hydroxy groups measured was 0.80 mmol OH/g.

Thus, for Support A, the two allyl ligands of the complex may react with two OH groups and form a polymerising chromium site according to the reaction:

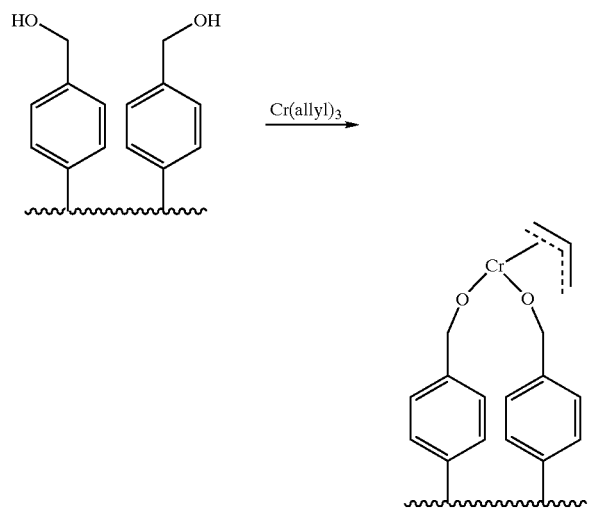

The following supported catalysts were been prepared:

Preparation of Catalyst I:

0.230 g washed and dry Support A containing 0.276 mmol OH groups were suspended in 15 ml cyclohexane. 2.4 ml (0.138 mmol) of a pentane solution of Cr(2-Me-allyl)$_3$ containing 4.8 mg Cr/g solution was then added at −10° C. The solution was stirred for 30 minutes. The colour of the suspension turns greenish. The solution was allowed to warm to ambient temperature and the solvent was removed under reduced pressure yielding a light green powder.

For Support B, the two allyl ligands of the chromium complex may react with two OH groups of one 4-(1,2-dihydroxyethyl)phenyl group or OH groups from two such groups on the support.

Preparation of Catalyst II:

1.56g Support B containing 0.40 mmol diol/g was suspended in 25 ml pentane and cooled to −30° C. Then 7.34 ml of a pentane solution containing 0.085 mmol Cr(2-Me-allyl)$_3$/ml was added by using a syringe. The suspension was stirred at −30° C. for about 30 minutes. The colour turns dark. The suspension was then warmed to ambient temperature while stirring for another 30 minutes before it was filtrated yielding a colourless filtrate and a greenish powder. The solid is dried well under reduced pressure. Yield: 1.50 g, stored in the glove box.

EXAMPLE 3

Ethylene polymerisations have been carried out with the allyl-chromium-based catalysts prepared in Examples 1 and 2. The polymerisation conditions and the results from these are given in Table 1 and 2 below.

TABLE 1

Polymerisation conditions and activity data from polymerisations with heterogeneous catalysts based on Cr(2-Me-allyl)$_3$. Catalyst I uses a benzyl alcohol functionalised carrier (Support A) while Catalyst II uses a diol functionalised carrier (Support B). Polyrnerisations in a 1-liter autoclave with 0.5–1 isobutane as diluent at 38 bar total pressure, 90° C.

| Catalyst | H$_2$ bar | 1-Hexene ml | Amount Catalyst mg | time min | Yield PE/g | Activity g poly./ gcat./hour |
|---|---|---|---|---|---|---|
| I | 0 | 0 | 100 | 85 | 25.9 | 183 |
| II | 1.0 | 0 | 200 | 30 | 54.5 | 545 |

TABLE 2

Characteristics of polymer produced with heterogeneous single site catalysts based on Cr(2-Me-allyl)$_3$. Polymerisations in a 1-liter autoclave with 0.5–1 isobutane as diluent at 38 bar total pressure 90° C.

| Cat | HLMI g/10 min | HLMI/MI | Density g/cm$^3$ | Mw | Mw/Mn |
|---|---|---|---|---|---|
| I | no flow | — | 0.935 | 595000 | 3.2 |
| II | 16.7 | 835 | 0.948 | 380000 | 114 |

The MWD for the product produced using Catalyst II is very broad with Mn=3300, Mw=380000 and Mw/Mn=114. The MWD curve has a low molecular weight tail giving most of the broadness. When a benzylalcohol functionalised carrier is used, i.e. using Catalyst I, a narrow MWD is obtained with Mw/Mn=3.2. In both cases the morphology of the polymer formed is excellent.

EXAMPLE 4

Triphenylchromate was reacted with a phenol functionalised carrier, Support C as described below:

Support C is a p-vinylphenol-co-styrene-co-divinylbenzene copolymer made analogously to Support A by copolymerising p-vinylphenol, styrene and divinylbenzene. The particles formed have an average particle diameter of 30 microns.

Preparation of Catalyst III:

1.50 g Support C containing 0.56 mmol OH/g was suspended in 50 ml toluene. 183 mg (Ph$_3$SiO)$_2$CrO$_2$ (to give 1.0 wt % Cr) was added and the suspension was refluxed overnight at 1.30° C. After cooling to ambient temperature, the suspension was filtrated. The solid was dried under reduced pressure yielding and stored in the glove box.

A catalyst activated with MAO was prepared:

Preparation of Catalyst IV:

0.730 g Catalyst III was added to a 50 ml round-neck bottle under argon atmosphere together with a magnetic stirrer. Assumes a pore volume of 1.5 ml/g. 1.0 ml MAO/ toluene (13.1 wt % Al) is added by using a syringe while stirring the powder giving a Al/Cr molar ratio of about 30. After about 30 minutes stirring the sample is dried under poor vacuum and stored in the glove box.

A number of polymerisation tests were carried out with these catalysts. The polymerisation conditions and results are given in Table 3 below.

TABLE 3

Results from polymerisations with heterogeneous catalysts based on $(Ph_3SiO)_2CrO_2$ on Support C (1.0% Cr). Polymerisations in a 1-liter autoclave with 0.5–1 isobutane as diluent at 38 bar total pressure, 90° C.

| Catalyst | $H_2$ | $m_{cat}$ mg | time min | Yield g | Activity g/(gcat.h) | M1 g/10 min | HLMI g/10 min | HLMI MI | Density g/cm$^3$ |
|---|---|---|---|---|---|---|---|---|---|
| IV | 0 | 309 | 110 | 13.1 | 23 | — | 0.02 | — | 0.950 |
| IV | 1.0 | 405 | 70 | 10.4 | 22 | 0.055 | 11.8 | 215 | — |
| IV | 1.0 | 330 | 103 | 9.7 | 17 | 0.22 | 29.3 | 133 | 0.947 |

The sensitivity towards hydrogen as a chain termination agent appears large, contrary to what would be expected for conventional chromium catalysts.

EXAMPLE 5

Preparation of Catalyst V:

1.00 g Support B containing 0.40 mmol diol/g was suspended in 30 ml toluene. 32.4 µl $Cl_2CrO_2$ was added and the suspension was stirred at ambient temperature for one hour. The suspension was filtrated yielding a colourless filtrate and a darkish powder. The solid was washed twice with 20 ml portions of pentane, then dried under reduced pressure yielding 1.10 g light brown powder with theoretically 2.0 wt % Cr.

MAO was introduced by the following procedure:

Preparation of Catalyst VI:

0.500 g Catalyst V was added to a Schlenck tube under argon atmosphere. 0.89 ml MAO/toluene was added dropwise using a syringe while stirring. After 30 minutes stirring and shaking, the tube was evacuated by using a vacuum, then introduced to the glove box. Yield 0.92 g light brown powder.

EXAMPLE 6

Preparation of Catalyst VII:

0.565g of Catalyst II prepared as in Example 2 was added to a Schlenck tube under argon atmosphere together with a magnetic stirrer. In a separate Thomas bottle 5 mg $(nBuCp)_2 ZrCl_2$ (12.4 µmol) was stirred with 2.1 ml MAO/toluene (13.1 wt % Al). 0.68 ml of this solution is then added by syringe to a dry sample of Catalyst II while stirring. After about 20 minutes stirring the sample is dried under vacuum and stored in a glove box. Yield 1.1 g.

EXAMPLE 7

Preparation of Catalyst VIII:

0.420 g of Catalyst II prepared as in Example 2 was added to a Schlenck tube under argon atmosphere together with a magnetic stirrer. In a separate Thomas bottle 5.5 mg $(nBuCp)_2ZrCl_2$ was stirred with 9.1 ml MAO/toluene (13.1 wt % Al). 0.50 ml of this solution was then added by syringe to a dry sample of Catalyst II while stirring. After about 30 minutes stirring the sample was dried under vacuum and stored in the glove box. Yield 0.89 g.

EXAMPLE 8

Preparation of Catalyst IX:

0.920 g of Catalyst II prepared as in Example 2 was added to a Schlenck tube under argon atmosphere together with a magnetic stirrer. In a separate Thomas bottle 14 mg $(nBuCp)_2 ZrCl_2$ was stirred with 8.2 ml MAO/toluene (13.1 wt % Al) and another 33.4 ml toluene for about 30 minutes.

TABLE 4

Results from polymerisations with Catalyst V and VI. Polymerisations in a 1-liter autoclave with 0.5–1 isobutane as diluent at 38 bar total pressure, 90° C.

| Catalyst | $H_2$ | $m_{cat}$ mg | time min | Yield PE g | Activity g/(gcat.h) | M1 g/10 min | HLMI g/10 min | HLMI MI | Density g/cm$^3$ |
|---|---|---|---|---|---|---|---|---|---|
| V* | 1.0 | 206 | 100 | 17.8 | 52 | — | — | — | — |
| VI | 1.0 | 460 | 60 | 30.0 | 65 | 3.9 | 300 | 77 | >0.96 |
| VI | 1.0† | 394 | 60 | 32.3 | 82 | 4.48 | 455 | 102 | 0.933 |

*MAO/toluene added to reactor, Al/Cr = 30.
†10 ml 1-hexene also added.

1.1 ml of this solution was then added by syringe to a dry sample of Catalyst II while stirring. After about 30 minutes stirring the sample was dried under vacuum and stored in the glove box. Yield 1.88 g.

EXAMPLE 9

As a reference catalyst a single site catalyst based on (nBuCp)$_2$ZrCl$_2$/MAO without the chromium component was prepared:

Support D is an unfunctionalised styrene-co.-divinylbenzene copolymer made in a similar fashion to Support A above by copolymerising styrene and divinylbenzene. The particles formed have a degree of cross-binding of 80%, a porosity of 70% and an average particle diameter of 30 microns.

Preparation of Catalyst X:

2.04 g of Support D was added to a Schlenck tube under argon atmosphere together with a magnetic stirrer. In a separate Thomas bottle 5.5 mg (nBuCp)$_2$ZrCl$_2$ was stirred with 9.1 ml MAO/toluene (13.1 wt % Al) for about 30 minutes. 2.45 ml of this solution is then added by syringe to the dry sample of Support D while stirring. After about 30 minutes stirring the sample is dried under vacuum and stored in a glove box. Yield 4.1 g. Al/Zr=2800.

EXAMPLE 10

Ethylene Polymerization

Ethylene was polymerized using the catalysts of Examples 6 to 9. Details are set forth in Tables 5 and 6 below.

TABLE 5

Catalyst parameters for the catalysts of Examples 6 to 9:

| Catalyst | wt % Cr | wt % Zr | Cr/Zr* | Al/Cr* | Al/Zr* |
|---|---|---|---|---|---|
| II | 2.0 | — | — | — | — |
| VII | 1.03 | 0.033 | 55 | 13 | 718 |
| VIII | 0.94 | 0.0077 | 215 | 13 | 2800 |
| IX | 0.98 | 0.0049 | 350 | 5 | 1000 |
| X | — | 0.0082 | — | — | 2800 |

*mole ratios

TABLE 6

Polymerisation conditions and activity data from polymerisations with heterogeneous catalysts of Examples 6 to 9. Polymerisations in a 1-liter autoclave with 0.5-L isobutane as diluent at 38 bar total pressure, 90° C.

| Metal | Catalyst Run No | H$_2$ bar | 1-Hex ml | m$_{cat}$ mg | time min | Yield PE g | Activity g/(g$_{cat}$·h) |
|---|---|---|---|---|---|---|---|
| Cr | II-1 | 1.0 | 0 | 200 | 30 | 54.5 | 545 |
| Cr/Zr | VII-1 | 1.0 | 0 | 197 | 12 | 65.0 | 1650 |
| Cr/Zr | VII-2 | 1.0 | 0 | 134 | 14 | 66.9 | 2140 |
| Cr/Zr | VII-3 | 1.0 | 10 | 95 | 15 | 68.7 | 2893 |
| Cr/Zr | VII-4 | 1.0 | 10 | 66 | 43 | 193.5 | 4091 |
| Cr/Zr | VIII-1 | 0 | 0 | 154 | 30 | 87.3 | 1134 |
| Cr/Zr | VIII-2 | 1.0 | 0 | 95 | 60 | 29.1 | 306 |
| Cr/Zr | VIII-3 | 1.0 | 10 | 125 | 60 | 42.0 | 336 |
| Cr/Zr | IX-1 | 0 | 0 | 373 | 45 | 92.3 | 330 |
| Cr/Zr | IX-2 | 1.0 | 0 | 345 | 45 | 85.1 | 329 |
| Cr/Zr | IX-3 | 1.0 | 10 | 305 | 60 | 93.4 | 306 |
| Zr | X-1 | 0 | 0 | 152 | 45 | 84.4 | 740 |
| Zr | X-2 | 1.0 | 0 | 145 | 30 | 96.7 | 1334 |
| Zr | X-3 | 1.0 | 10 | 145 | 45 | 36.8 | 338 |

TABLE 6-continued

Characteristics of polymer produced with heterogeneous catalysts of Examples 6 to 9. Polymerisations in a 1-liter autoclave with 0.5-L isobutane as diluent at 38 bar total pressure 90° C.

| Catalyst Run No. | MI g/10 min | HLMI g/10 min | HLMI MI | Density g/cm$^2$ | M$_w$/ 10$^3$ | M$_w$ M$_n$ |
|---|---|---|---|---|---|---|
| II-1 | 0.02 | 16.7 | 835 | 0.948 | 380 | 114 |
| VII-1 | 238 | — | — | 0.945 | — | — |
| VII-2 | 330 | — | — | >0.96 | — | — |
| VII-3 | 420 | — | — | >0.96 | — | — |
| VIII-1 | 0.12 | 3.2 | 27 | 0.941 | 245 | 2.8 |
| VIII-2 | 1600 | — | — | >0.96 | — | — |
| VIII-3 | 1400 | — | — | >0.96 | 41 | 28 |
| IX-1 | 0 | 0.046 | — | 0.935 | 1112 | 28 |
| IX-2 | 0.017 | 2.43 | 143 | 0.946 | — | — |
| IX-3 | 0.022 | 2.31 | 105 | 0.945 | 370 | 85 |
| X-1 | 0.18 | 4.2 | 23 | 0.937 | — | — |
| X-2 | 2.75 | 158 | 61 | 0.960 | — | — |
| X-3 | 5000 | — | — | >0.96 | — | — |

The IR spectra of selected polymers in the region 850 to 1050 nm are shown in FIG. 1. The morphology of all polymers produced was excellent.

What is claimed is:

1. A supported chromium catalyst system comprising a chromium catalyst bound via at least one heteroatom to a functionalised support, said heteroatom being connected to said support via an organic group wherein said chromium catalyst is derived from (i) a compound of formula (I)

$$CrA_xR_y \qquad (I)$$

wherein each A independently represents an η-ligand; each R independently represents halogen, alkenyl, siloxy, alkyl, alkoxy, amido or cyclopentadienyl; x is an integer of 1 or 2; and y is an integer of 1 to 2 wherein x+y=3;

(ii) a compound of formula (II)

$$CrD_4 \qquad (II)$$

wherein each D independently represents alkyl, siloxy, alkoxy, oxo, halo or aryl, provided that if D is oxo then only two oxo groups are present;

or (iii) a compound of formula Cr(η-ligand)$_2$ or CrD(η-ligand) wherein D represents alkyl, siloxy, alkoxy, oxo, halo or aryl.

2. A catalyst system as claimed in claim 1 wherein said chromium catalyst precursor is Cr (allyl)$_3$, tris-(2-methyl allyl) chromium, CrCp'$_2$, O$_2$CrCl$_2$, or O$_2$Cr(OSiR'$_3$)$_2$ wherein Cp' represents an unsubstituted cyclopentadienyl group and R' represents phenyl, tertbutyl, methyl, isopropyl, octenyl, ethyl or 1,1,2,2-tetramethylpropyl.

3. A catalyst system as claim 1 or claim 2 wherein said support comprises acrylate polymer particles or styrene-divinylbenzene polymer particles.

4. A catalyst system as claimed in claim 1 or claim 2 wherein said support comprises at least one group X wherein X represents an organic group comprising said heteroatom.

5. A catalyst system as claimed in claim 4 wherein X represents a deprotonated C$_{1-10}$ alcohol, C$_{1-10}$ amine, a C$_{1-10}$ thiol group, an aryl group bound to an NH, SH or OH group, a C$_{1-10}$ diol or C$_{1-10}$ diamine group.

6. A catalyst system as claimed in claim 4 wherein X comprises a deprotonated OH, —N(alkyl)H or —NH$_2$ group.

7. A catalyst system as claimed in claim 5 wherein X represents a deprotonated benzyl alcohol or 1,2-dihydroxyethyl phenyl group.

8. A catalyst system as claimed in claim 7 wherein the benzyl alcohol or 1,2-dihydroxyethyl phenyl group is bound to the support via the 4-position on the phenyl ring.

9. A catalyst system as claimed in claim 1 wherein said support has impregnated therein a further polymerisation active metal complex.

10. A process for the preparation of a supported chromium catalyst system as claimed in claim 1 comprising:

(1) reacting (i) a chromium compound of formula (I)

$$CrA_xR_y \tag{I}$$

wherein each A independently represents an η-ligand; each R independently represents halogen, alkenyl, siloxy, alkyl, alkoxy, amido or cyclopentadienyl; x is an integer of 1 or 2; and y is an integer of 1 to 2 wherein x+y 3;

(ii) a compound of formula (II)

$$CrD_4 \tag{II}$$

wherein each D independently represents alkyl, siloxy, alkoxy, oxo, halo or aryl provided that if D is oxo then only two oxo groups are present;

or (iii) a compound of formula $Cr(\eta\text{-ligand})_2$ or $CrD(\eta\text{-ligand})$ wherein D represents alkyl, siloxy, alkoxy, oxo, halo or aryl; with a functionalised support in a solvent to bind said compound to said functionalised support via at least one heteroatom attached to said support via an organic group; and (2) recovering a supported catalyst precursor as a free-flowing solid or slurry.

11. A process as claimed in claim 10 further comprising a step of impregnating said support with a polymerisation active metal complex, between steps (I) and (II).

12. A particulate organic polymer support having a pKa of less than 20, metallated with a catalytically effective amount of chromium.

13. A process of polymerisation comprising polymerising at least one olefin in the presence of a supported catalyst system as claimed in claim 1.

14. A process as claimed in claim 13 which takes place in the absence of a cocatalyst.

15. A process as claimed in claim 13 wherein a cocatalyst is employed.

* * * * *